United States Patent
Monte et al.

(10) Patent No.: US 7,630,682 B2
(45) Date of Patent: *Dec. 8, 2009

(54) SATELLITE COMMUNICATION SYSTEM EMPLOYING A COMBINATION OF TIME SLOTS AND ORTHOGONAL CODES

(75) Inventors: Paul A. Monte, San Jose, CA (US); Vijaya Gallagher, San Jose, CA (US)

(73) Assignee: Globalstar, Inc., Milpitas, CA (US)

( * ) Notice: Subject to any disclaimer, the term of this patent is extended or adjusted under 35 U.S.C. 154(b) by 582 days.

This patent is subject to a terminal disclaimer.

(21) Appl. No.: 11/325,176

(22) Filed: Jan. 4, 2006

(65) Prior Publication Data

US 2007/0155316 A1    Jul. 5, 2007

(51) Int. Cl.
*H04B 7/185* (2006.01)
(52) U.S. Cl. .................. 455/12.1; 455/427; 455/3.02; 455/437

(58) Field of Classification Search ................. 455/12.1, 455/13.2, 3.02, 3.03, 427, 430, 428, 456.1, 455/429, 437, 436, 446, 13.4, 69; 370/252, 370/321, 329, 401, 259
See application file for complete search history.

(56) References Cited

U.S. PATENT DOCUMENTS

| 6,788,917 B1 * | 9/2004 | Refai et al. ............... 455/12.1 |
| 2004/0037238 A1 * | 2/2004 | Schiff et al. ............... 370/321 |
| 2005/0159103 A1 * | 7/2005 | McNeely ................... 455/3.01 |
| 2006/0240767 A1 * | 10/2006 | Jacomb-Hood et al. .... 455/12.1 |

* cited by examiner

Primary Examiner—John Lee
(74) Attorney, Agent, or Firm—Kenneth W. Float

(57) ABSTRACT

A satellite communication system is disclosed which provides multiple beams and employs a plurality of user terminals (UT) and at least one gateway connected to a PSTN which communicates with at least one UT over the constellation wherein each of the UTs within a given frequency band is distinguished one from the other employing a combination of time slots and orthogonal codes.

18 Claims, 3 Drawing Sheets

FIG. 2A | FIG. 2B    FIG. 2

Figure 1:
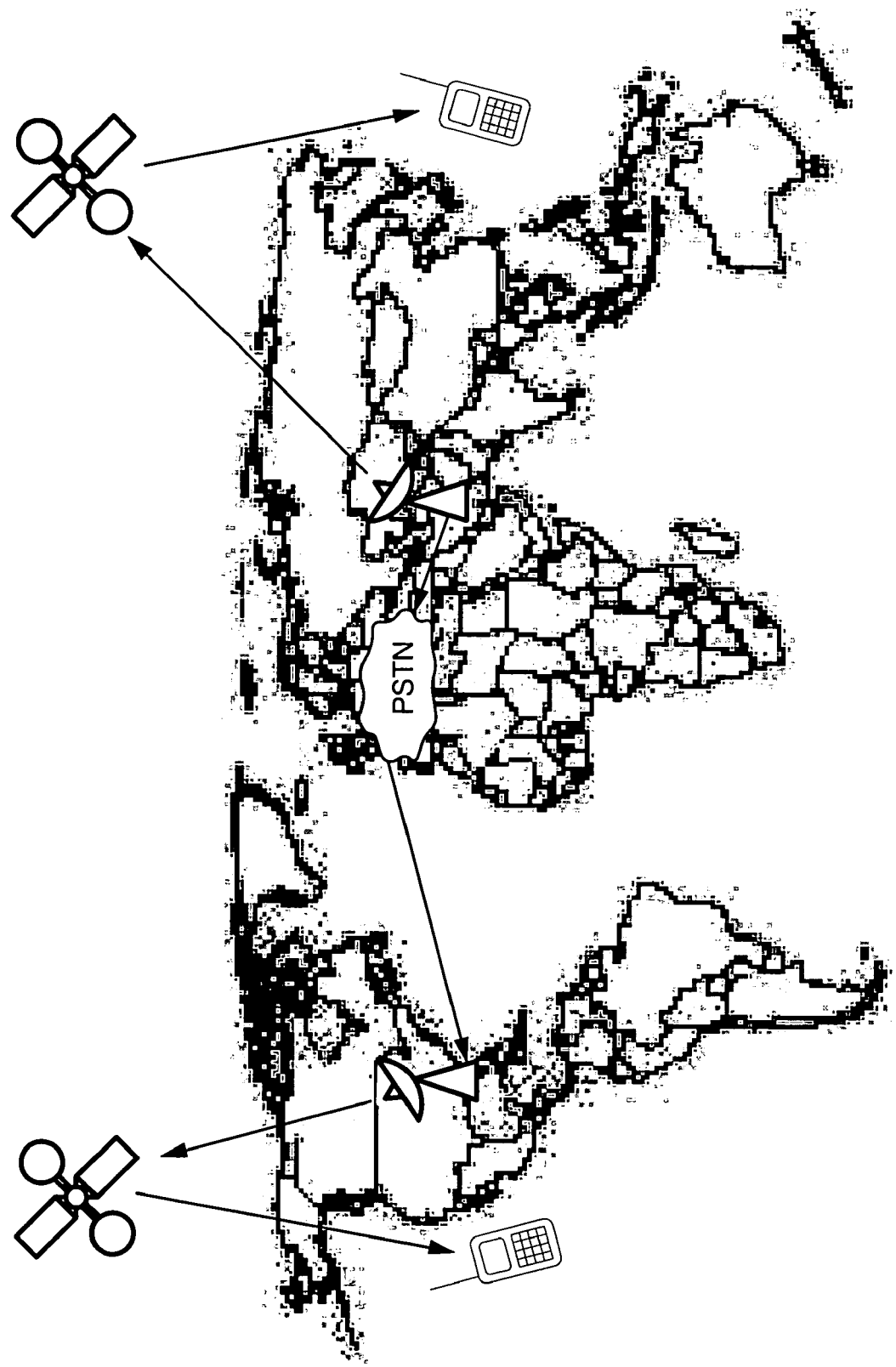

SATELLITE COMMUNICATION SYSTEM EMPLOYING A COMBINATION OF TIME SLOTS AND ORTHOGONAL CODES

I. FIELD OF THE INVENTION

The present invention relates to cellular telephone systems. More specifically, the present invention relates to new and improved systems and methods for communicating information in mobile cellular telephone systems or satellite mobile telephone systems employing spread spectrum communication signals.

II. BACKGROUND OF THE INVENTION

Historically, the telephone, which comes from the Greek word 'tele', meaning from afar, and 'phone', meaning voice or voice sound, is said to have been invented on Mar. 10, 1876 in Boston, Mass. by Alexander Graham Bell. The principle of the telephone was conceived as early as 1874 combining electricity and voice which led to Bell's actual invention of the telephone in 1876.

U.S. Pat. No. 174,465 issued Mar. 3, 1876 for improvements in telegraphy is now considered to be the most valuable patent ever issued.

Telstar, the world's first international communications satellite, years later was placed into orbit on Jul. 10, 1962 in a collaboration between NASA and the Bell System. Today satellites in geosynchronous orbit are used mostly for long distance service.

The basic concept of cellular phones which began in 1947 with crude mobile car phones resulted in the realization that using small cells or range of service area with frequency re-use could increase the traffic capacity of mobile phones substantially. However, at this point in time the technology was nonexistent. The cellular telephone is in fact a type of two-way radio which in 1947 AT&T proposed at the FCC allocated large number of radio spectrum frequencies so that widespread mobile phone service could become feasible and provide AT&T an incentive to research the new technology. The FCC's decision to limit the cellular phone frequencies in 1947 resulted in the possibility of only 23 cellular phone conversations which could occur simultaneously in the same service area. In 1968 this was increased. Thereafter, a cellular phone system was proposed by Bell Laboratories. In 1977 AT&T Bell Labs constructed and operated a prototype cellular phone system. In 1981 Motorola and America Radio Phone started a second U.S. cellular radio phone system test in the Washington/Baltimore area. Suddenly consumer demand quickly outstripped the cellular phone system's 1982 standards so that by 1987 cellular phone subscribers exceeded one million and the airwaves were crowded. To stimulate the growth of new cellular phone technology, the FCC declared in 1987 that cellular phone licenses may employ alternative cellular phone technologies in the 800 megahertz band.

Digital wireless and cellular find their roots back in the 1940s when commercial mobile telephony began. On Jun. 17, 1946 in St. Louis, Mo., AT&T and Southwestern Bell introduced the first American commercial mobile radio telephone service and mobile telephony a channel is a pair of frequencies, one frequency to transmit on and one to receive.

A cell phone is a portable telephone which receives or sends messages through a cell site or transmitting tower. Radio waves are used to transfer signals to and from the cell phone, each cell site having a range of 3-5 miles and overlapping other cell sites. All of the cell sites are connected to one or more cellular switching exchanges which can detect the strength of the signal received from the telephone. As the telephone user moves or roams from one cell area to another, the exchange automatically switches the call to the cell site with the strongest signal. The term 'cell phone' is uncommon outside the United States and Japan. However, almost all mobile phones use cellular technology including GSM, CDMA and the old analog mobile phone systems. Hence, the term 'cell phone' has been regarded by many to designate any mobile telephone system. An exception to mobile phones which employ cellular technology are satellite phones; for example, the Iridium phone system which is very much like a cell phone system except the cell sites are in orbit. Marine radio telephone satellites administered by Inmarsat have a completely different system. The Inmarsat satellite system simply retransmits whatever signals it receives with a mobile station's actually logging into a ground station.

With the advent of the Globalstar® satellite telephone system, a great advance in the art was recognized by virtue of a basic telephonic satellite technology which provided a constellation of 48 satellites in low earth orbit which were much simpler to build and less expensive than those of Iridium employing a radically different technology which employs code division multiple access, or CDMA, technology, converting speech signals into a digital format and then transmitting it from the Globalstar® satellite phone up to satellite systems and down to the ground station. Every call on the Globalstar® system possesses its own unique code which distinguishes it from the other calls sharing the airwaves at the same time, and employing CDMA provides signals which are free of interference, cross-talk or static. CDMA was introduced in 1995 and soon became the fastest growing wireless technology and one that was chosen by Globalstar® for use in its satellite communications network, which service Globalstar® launched in 2000.

The key features of the Globalstar® satellite phone employing CDMA provide unique forward and reverse links, direct sequence spread spectrum, seamless soft handoff, universal frequency re-use, propagation through multiple overlapping beams on multiple satellites for diversity, and variable rate transmission.

The Globalstar® satellite phone service is delivered through 48 low earth orbiting satellites providing both voice and data services. The so-called Globalstar® LEO constellation consists of satellites arranged in a Walker constellation, and each satellite is approximately 700 miles from the earth which allows for the highest quality voice clarity of any satellite phone in the industry. At the heart of the Globalstar® system as initially proposed is Qualcomm's adaptation of code division multiple access technology which provides Globalstar's® digital satellite service, resulting in a technology which provides signal security, superior quality, fewer dropped calls and greater reliability. Calls can be made from any gateway via any satellite of the system to any user terminal, as long as the satellite is co-visible from both gateway and user terminal. This co-visibility is what defines a gateway service area; at least 24 gateways around the globe are used to provide worldwide coverage. Each satellite serves at least 2,000 simultaneous users.

The Globalstar® system employs redundancy with every call that a customer places so that a call is routed through as many as four satellites which then combine the signal into a single static-free call. In the event that one of the paths to one of the satellites is blocked, the other satellites keep the call from terminating, applying the technology of path diversity which minimizes dropped calls and enhances the quality of the Globalstar® satellite phone service. The Globalstar® system employs bent pipe technology which allows a call to be first beamed up to the satellite and then retransmitted to a relatively close gateway. The call is then sent through its call destination through land line or cellular networks. The Globalstar® gateway carries out all the processing and switching of the calls which improves the reliability of the call delivery, unlike the Iridium system which requires satellite-to-satellite transmission.

In addition, the Globalstar® system, which provides reliable call delivery with voice characteristics the same or better than conventional telephony, complements the current cellular telephone systems in existence by allowing the user to first use conventional cellular, which is far less expensive but totally dependent upon the proximity of cell sites for its reliability, and then allows the user to select the Globalstar® satellite system where cell sites are far too distant to be reliable or in remote locations where these sites are nonexistent. Code division multiple access, which refers to a multiple access scheme where stations use spread spectrum modulations and orthogonal codes to avoid interfering with one another, is typically employed in Globalstar® systems. The CDMA modulation technique is one of several techniques for facilitating communications in which a large number of system users are present. Other multiple access communications system techniques such as time division multiple access (TDMA), frequency division multiple access (FDMA), and AM modulation schemes such as amplitude expanded single sideband (ACSSB) are known in the art. The spread spectrum modulation technique of CDMA is found to have significant advantages over these modulation techniques for multiple access communications systems. CDMA techniques in multiple access communications systems are disclosed in U.S. Pat. No. 4,901,307 entitled Spread Spectrum Multiple Access Communication System Using Satellite or Terrestrial Repeaters, the disclosure thereof is incorporated by reference.

In this patent, a multiple access technique is disclosed where a large number of mobile telephone system users each having a transceiver communicate through satellite repeaters or terrestrial base stations, also referred to as cell sites stations, cell sites, or for short cells, using code division multiple access (CDMA) spread spectrum communication signals. Frequency spectrum employed in CDMA can be reused multiple times, thus permitting an increase in system user capacity. The CDMA is found to result in a much higher spectral efficiency than can be achieved using other multiple access techniques.

Satellite channels employing this system typically experience fading that is characterized as Rician. Accordingly, this signal is found to consist of a direct component summed with a multiple reflected component having a Rayleigh fading statistic. A power ratio between the direct and reflected component is typically found to be on the order of 6 to 10 dBs depending upon the characteristics of the mobile unit antenna and the environment about the mobile unit. Contrasted to the satellite channel, the terrestrial channel experiences signal fading that typically consists of the Rayleigh faded component without a direct component. This terrestrial channel is found to present a more severe fading environment than the satellite channel in which the Rician fading is the dominant fading characteristic.

The Rayleigh fading characteristics experienced in the terrestrial signal is found to be caused by the signal being reflected from many different features of the physical environment, resulting in a signal which arrives at a mobile unit receiver from many directions with different transmission delays. In the UHF frequency bands which are usually employed for mobile radio communications, including cellular mobile telephone systems, there is found to be significant phase differences in signals traveling on different paths which provides the possibility of destructive summation of the signals causing occasional deep fades. Physical position of the mobile unit is a strong function of the terrestrial channel fading so that small changes in the position of the mobile unit change the physical delays of all the signal propagation paths which further result in a different phase for each path. The motion of the mobile unit through the environment can result in a rapid fading process; for example, employing 850 MHz cellular radio frequency band, the fading can typically be as fast as one fade per second per mile per hour of the vehicle speed. This level of fading is found to be extremely disruptive to signals in a terrestrial channel, resulting in poor communication quality. Quality may be improved by providing additional power to overcome the fading, which in itself affects both the user in excessive power consumption and the system by increased interference. Certain CDMA modulation techniques disclosed in U.S. Pat. No. 4,901,307 offer some advantages over narrow band modulation techniques using communication systems employing satellite or terrestrial repeaters. The terrestrial channel is found to pose special problems to any communication system, particularly with respect to multiple path. These problems may be overcome by using CDMA techniques which overcome the special problems of the terrestrial channel by mitigating the adverse effect of multipath, for example fading, while also exploiting the advantages of multipath.

CDMA cellular telephone systems allow the same frequency band to be employed for communication in all calls. CDMA waveform properties that provide processing gain are also used to discriminate between signals that occupy the same frequency band. Furthermore, the high speed pseudonoise PN modulation allows many different propagation paths to be separated provided the difference in path delay exceed the PN chip duration; i.e., 1/bandwidth. It is found that if a PN chip rate of approximately one MHz is employed in a CDM system, the full spread spectrum processing gain equal to the ratio of the spread bandwidth to system data rate can be employed against paths that differ by more than one microsecond in path delay from desired path. It is found that a one microsecond path delay differential corresponds to differential path distance of approximately 1,000 feet, the urban environment typically providing differential path delays in excess of one microsecond and up to 10-20 microseconds in some areas. When narrow band modulation systems are employed, such as at analog FM modulation, by conventional telephone systems, the existence of multiple paths results in severe multipath fading. By employing wideband CDMA modulation, the different paths may be discriminated against in the demodulation process which greatly reduces the severity of multipath fading. Although multipath fading is not totally eliminated using CDMA discrimination techniques, there will occasionally exist paths with delayed differentials of less than the PN chip duration for the particular system. For signals which possess path delays on this order, it is found that signals cannot be discriminated against in the demodulator, resulting in some degree of fading.

It becomes apparent that some form of diversity is desirable which would permit a system to reduce fading. One such system is diversity which mitigates the deleterious effects of fading. The three major types of diversity which may be employed are time diversity, frequency diversity and space diversity. Time diversity is found to be best obtained by the use of repetition, time interleaving and error detection and coding which is a form of repetition.

CDMA by its inherent nature possessing a wide band signal which offers a form of frequency diversity by spreading the signal energy over a wide bandwidth, resulting in a small part of the CDMA signal bandwidth experiencing selective fading effects.

Space or path diversity is obtained by providing multiple signal paths through simultaneously links from a mobile user through two or more cell sites. Path diversity may be obtained by exploiting the multipath environment through spread spectrum processing by allowing a signal arriving with different propagation delays to be received and processed separately. In U.S. Pat. No. 5,101,501 entitled Soft Handoff in a CDMA Cellular Telephone System, and U.S. Pat. No. 5,109,390 entitled Diversity Receiver in a CDMA Cellular Telephone System, examples of path diversity are illustrated. Further control of deleterious effects in a CDMA system may be realized by controlling transmitter power. Such a system for cell site mobile unit power control is disclosed in U.S. Pat. No. 5,056,109 entitled Method and Apparatus for Controlling Transmission Power in a CDMA Cellular Mobile Telephone System. Techniques as disclosed in U.S. Pat. No. 4,901,307 contemplate the use of coherent modulation and demodulation for both directions of the link in mobile satellite communications. A pilot carrier signal as a coherent phase reference for the satellite to mobile link and the cell to mobile link is disclosed. It is found, however, that the severity of multipath fading experienced in the terrestrial cellular environment with the resulting phase disruption of the channel precludes usage of coherent demodulation techniques for the mobile to cell link.

Relatively long PN sequences with each user channel being assigned a different PN sequence are also disclosed in U.S. Pat. No. 4,901,307. The different user signals may be discriminated upon reception employing the cross correlation between different PN sequences and the auto correlation of a PN sequence for all time shifts other than zero where both have a zero average value. Although the cross correlations average zero for a short time interval, such as an information bit time, the cross correlation follows a binomial distribution since PN signals are not orthogonal. As such, signals interfere with each other much the same as if they were wide bandwidth Gaussian noise resulting in other user signals or mutual interference noise ultimately limiting the achievable capacity.

Multipath can provide path diversity to a wide band PN CDMA system which uses greater than 1 MHz bandwidth if two or more paths are available with greater than one microsecond differential path delay. Two or more PN receivers can be employed to separately receive these signals. These signals typically will exhibit independence in multipath fading, i.e., they usually do not fade together, the outputs of the two receivers can be diversity combined. It is found that a loss in performance in this situation only occurs when both receivers experience fades at the same time, hence two or more PN receivers in combination with a diversity combiner may be employed utilizing a waveform that permits path diversity combining operations to be performed.

In U.S. Pat. No. 4,901,307 filed Oct. 17, 1986, issued Feb. 13, 1990, a communication system which accommodates a large number of users throughout a variety of user environments from high density urban to very low density rural is provided which results in a multiple access communication system having high simultaneous user capacity.

In U.S. Pat. No. 5,101,501 filed Nov. 7, 1989, issued Mar. 31, 1992, there is disclosed a CDMA cellular telephone system wherein the same frequency band is used for all cells employing CDMA waveform properties that provide processing gains which are also used to discriminate between signals that occupy the same frequency band.

In U.S. Pat. No. 5,103,459 filed Jun. 25, 1990, issued Apr. 7, 1992, there is disclosed spread spectrum communication techniques, particularly CDMA techniques, in the mobile cellular telephone environment which provide features to vastly enhance system reliability and capacity over other communication system techniques overcoming fading and interference while providing greater frequency reuse and enabling a substantial increase in the number of system users.

In U.S. Pat. No. 5,109,390 filed Nov. 7, 1989, issued Apr. 28, 1992, there is disclosed a CDMA cellular telephone system where the same frequency band is used for communication in all cells to provide a cellular telephone system in which a receiver design facilitates reception and processing of the strongest signals transmitted from one or more cell sites, the signals being multipath signals from a single cell site or signals transmitted by multiple cell sites.

In U.S. Pat. No. 5,233,626 filed May 11, 1992, issued Aug. 3, 1993, there is disclosed a repeater diversity spread spectrum communication system providing substantially fade free communications between a transmitter (1) and a receiver (7). A transmitted signal is relayed through a plurality of linear communications repeaters (3-6) that produce copies of the transmitted signal, the copies each arriving through an independently fading signal path. The receiver processes the received signal copies to equalize them to one another in delay, frequency, and phase, and then combines the multiple received and equalized signal copies to produce a composite signal having a greatly reduced fading depth.

In U.S. Pat. No. 5,267,261 filed Mar. 5, 1992, issued Nov. 30, 1993, there is provided a system for directing handoff in mobile station communication between base stations which employ code division multiple access techniques.

In U.S. Pat. No. 5,267,262 filed Oct. 8, 1991, issued Nov. 30, 1993, there is disclosed a CDMA cellular mobile telephone wherein the transmitter power of the mobile units are controlled so as to produce at the cell site a nominal received signal power from each and every mobile unit transmitter operating within the cell. Thus, the transmitter power is controlled in the terrestrial channel and the cell diversity environment so as to overcome deleterious fading without causing unnecessary system interference.

In U.S. Pat. No. 5,303,286 filed Mar. 29, 1991, issued Apr. 12, 1994, there is disclosed a radio communication system capable of servicing a roaming user or the like outside the range of terrestrial relay stations including a packet switched network and database of roaming users, a satellite communications system having at least one, but usually a plurality of orbiting satellites over a terrestrial satellite service area, a satellite control center and a plurality of terrestrial communication links wherein call setup is controlled by processors and databases onboard the orbiting satellites and wherein only after the satellite link for the communication channels is completed, does control and switching rely on ground base system such that the orbiting satellites are integrated into a ground based telephone network and tariff structure.

In U.S. Pat. No. 5,309,474 filed Mar. 27, 1992, issued May 3, 1994, there is disclosed spread spectrum communication techniques, particularly CDMA, in a mobile cellular telephone environment which provides features to vastly enhance system reliability and capacity over other communication system techniques.

In U.S. Pat. No. 5,416,797 filed Jan. 24, 1992, issued May 16, 1995, there is disclosed a system for constructing PN sequences that provide orthogonality between the users so that mutual interference will be reduced allowing higher capacity and better link performance, employing spread spectrum communication techniques, particularly CDMA, in a mobile cellular telephone environment.

In U.S. Pat. No. 5,715,297 filed Sep. 15, 1995, issued Feb. 3, 1998, there is disclosed a radio communication system capable of servicing a roaming user or the like outside the range of terrestrial relay stations which includes a packet switched network and database of roaming users, a satellite communications system having at least one, but usually a plurality of orbiting satellites over a terrestrial satellite service area, a satellite control center and a plurality of terrestrial communication links, wherein call setup is controlled by processors and databases onboard the orbiting satellites and wherein only after the satellite link for the communication channels is completed, does control and switching rely on ground based equipment such that the orbiting satellites are integrated to a ground based telephone network and tariff structure.

In U.S. Pat. No. 5,903,837 filed Sep. 22, 1997, issued May 11, 1999, there is disclosed a radio communication system capable of servicing a roaming user or the like outside the range of terrestrial relay stations which includes a packet switched network and database of roaming users, a satellite communications system having at least one, but usually a plurality of orbiting satellites over a terrestrial satellite service area, a satellite control center and a plurality of terrestrial communication links wherein call setup is controlled by processors and databases onboard the orbiting satellites and wherein only after the satellite link for the communication channel is completed, does control and switching rely on ground based equipment such that the orbiting satellites are integrated into a ground based telephone network and tariff structure.

In U.S. Pat. No. 6,032,041 filed Jun. 2, 1997, issued Feb. 29, 2000, there is disclosed a satellite based communication system operating at high data rates including a plurality of satellites each having uplink and downlink antennas for transmitting and receiving a plurality of signals utilizing a plurality of spot beams to and from a plurality of coverage areas at a predetermined range of frequencies. The system also includes a plurality of user terminals for transmitting and receiving signals to and from the plurality of communication satellites at the predetermined range of frequencies and at one of the first plurality of data rates. Each of the user terminals have a steerable antenna for tracking relative motion of each of the user terminals with respect to each of the plurality of communication satellites and for tracking movement of each of the plurality of communication satellites in order to maintain communications with the plurality of communication satellites.

In U.S. Pat. No. 6,041,233 filed Sep. 12, 1997, issued Mar. 21, 2000, there is disclosed a method and system for providing global variable data rate connectivity in a satellite based communications network which includes a plurality of communications satellites for transmitting and receiving signals in a plurality of coverage areas. User terminals transmit and receive signals to and from the satellites. A set of the user terminals located in one of the coverage areas and associated with one of the communications satellites has a variable bandwidth associated therewith. The variable bandwidth is determined based on the collective bandwidth requirements of each of the user terminals in the set. Each of the user terminals may request a change in their bandwidth requirement independent of the variable bandwidth associated with the collective set of the user terminals.

In U.S. Pat. No. 6,072,768 filed Sep. 4, 1996, issued Jun. 6, 2000, there is disclosed a communication system having a satellite communication component comprising at least one satellite and at least one terrestrial gateway and also a wireless terrestrial communication component comprising at least one repeater and at least one mobile switching center, the gateway and switching center coupled together by a first mobile applications part network, the gateway and the mobile switching center further coupled to a terrestrial communication network, further including at least one dual mode or higher tri-mode user terminal comprising a first transceiver for bidirectionally communicating with the gateway through the satellite, a second transceiver for bidirectionally communicating with the mobile switching center through the repeater and a controller responsive to one of a user selected or a gateway selected protocol for selectively enabling either the first or the second transceiver for conveying a user communication to a terrestrial communication network.

In U.S. Pat. No. 6,339,707 filed Sep. 14, 1999, issued Jan. 15, 2002, there is disclosed a satellite based communication system operating at high data rates including a plurality of satellites each having uplink and downlink antennas for transmitting and receiving a plurality of signals utilizing a plurality of spot beams to and from a plurality of coverage areas at a predetermined range of frequencies. The system also includes a plurality of user terminals for transmitting and receiving signals to and from the plurality of communications satellites at the predetermined range of frequencies and at one of the first plurality of data rates. Each of the user terminals having a steerable antenna for tracking relative movement of each of the user terminals with respect to each of the plurality of communications satellites are for tracking movement of each of the plurality of communication satellites in order to maintain communications with the plurality of communications satellites.

In U.S. Pat. No. 6,396,822 filed Jul. 13, 1998, issued May 28, 2002, there is disclosed a method and apparatus for encoding data for transmission in a communication system which provides increased efficiency and bandwidth utilization through higher data rates, lower error rates, lower power levels and/or increased capacity. A set of orthogonal codes is partitioned into subsets. The data to be transmitted is partitioned into packets of bit sequences, each of which is mapped to an orthogonal code in an assigned subset. The number of members in a particular subset is determined by the relative transmission requirements of the data signal the subset will be used to encode.

In U.S. Pat. No. 6,510,147 filed Jul. 13, 1998, issued Jan. 21, 2003, there is disclosed a system and method for transmitting wideband signals via a radio communication system adapted for transmitting narrowband signals. A base station is used to transmit and receive a plurality of relatively narrowband and a plurality of relatively wideband signals. The electromagnetic spectrum available to the plurality of narrowband signals is selectively shared with the electromagnetic spectrum available to the wideband signals by systematically separating the orthogonal codes and the carrier frequencies used for transmission. The frequencies of the orthogonal codes are preferably mutually exclusive and the carrier frequencies are preferably separated by an offset. The offset may be substantially equal to an energy or multiple of the narrowband signals chip rate. Alternatively, the offset may be substantially equal to an odd multiple of one-half the narrowband signals chip rate in which case every other bit of the orthogonally encoded data is inverted.

In U.S. Pat. No. 6,515,617 filed Nov. 25, 1998, issued Feb. 4, 2003, there is disclosed a system 20 and a method 30 for estimating the location of a terrestrial based user terminal 23. The user terminal 23 is capable of measuring the relative signal strengths of a plurality of spot beams pilot signal emitted from a geostationary satellite 22. The user terminal 23 then estimates its position based on the measured relative signal strengths. Using this approach, the user terminal 23 can quickly determine its location without prior knowledge of its position or delay time.

In U.S. Pat. No. 6,640,236 filed Aug. 31, 1999, issued Oct. 28, 2003, there disclosed an apparatus for generating a PN sequence with an arbitrary number of bits where the number of bits is provided in parallel with each clock pulse, allowing the sequences to be generated at high speed when needed and allowing parallel processing in the acquisition and demodulation processes.

In U.S. Pat. No. 6,693,951 filed Jul. 23, 1999, issued Feb. 17, 2004, there is disclosed implementation of spread spectrum communication techniques, particularly CDMA, in a mobile cellular telephone environment which provides features that vastly enhance system reliability and capacity over other communication system techniques, overcoming, for example, fading and interference while promoting greater frequency reuse, enabling a substantial increase in the number of system users.

In U.S. Pat. No. 6,697,345 filed Jul. 23, 1999, issued Feb. 24, 2004, there is disclosed a radio and related methods of radio communication consisting of one or more signal formatters wherein the one or more signal formatters format signals for transmission to the radio and the signals comprise a plurality of transport mode signals. The radio also includes a modem coupled to one or more signal formatters for modulating the signals, a frequency converter coupled to the modem for up-converting the signals having been modulated to a radio frequency and a transceiver unit coupled to the frequency converter for transmitting the signals having been up-converted over a radio communications link.

In U.S. Pat. No. 6,714,780 filed Jun. 12, 2001, issued Mar. 30, 2004, there is disclosed a multibeam communication system having a user terminal, a communications station for transmitting information to and receiving information from the user terminal and a plurality of beam sources where each beam source projects a plurality of beams and where a communication link between the user terminal and the communications station is established on one or more beams, providing a system and method for reducing call dropping rates while maintaining a desired level of beam source diversity.

In U.S. Pat. No. 6,839,007 filed Sep. 9, 2002, issued Jan. 4, 2005, there is disclosed embodiments which address the need for reliable transmission of higher priority data within a frame wherein an inner code is applied to one or more partial segments of a transmitted data frame, in addition to an outer code applied to the entire frame, the inner code segment being retained when the inner decoding decodes without error providing the benefit of reducing the number of retransmissions of higher priority data, as well as reducing delay for time sensitive segments of the frame.

Various satellite telephone systems have been proposed, including those as depicted in the FCC filing for "Authority to Launch and Operate a Satellite System to Provide Mobile Satellite Services in the 2 GHz Bands" dated Nov. 3, 2000, relating to the Globalstar® system, which is hereby incorporated by reference; the FCC filing in the matter of Mobile Satellite Ventures Subsidiary, LLC for "Minor Amendment of Application to Launch and Operate a Replacement L Band Mobile Service Satellite at 101° West" dated Nov. 18, 2003; and the FCC filing by Thoraya which depicts a one GEO satellite system to provide a satellite telephone service.

Thus, it can be seen from the inception of the telephone through its various phases of improvement, cellular to satellite cellular telephony, a vast number of advances have been made which provide a modern, efficient and affordable telephone system which today, in many cases, supplants the existing telephone system and may in the future do so on an increasing basis.

There is, however, a continuing demonstrated need to provide improved satellite constellation systems, preferably LEO systems, which provide multiple beams to a plurality of users and employ at least one gateway connected to a PSTN communicating with a user over the constellation where each of the users within a given frequency band is distinguished from another employing orthogonal codes.

Although previous patents such as U.S. Pat. No. 4,901,307 describe or reference a multi-beam satellite system, these beams are considered to cover fixed regions on the ground, which requires a GEO satellite. In this case, the same sort of hand-off of a user terminal from beam to beam can be used as is used in a terrestrial cellular system. However, the '307 patent does not address the case where the beams and satellites are rapidly moving as they are in a MEO or LEO system, since it was written in an era that preceded the satellite technology that enabled large numbers of relatively smaller satellites (such as Globalstar's®) to be economically and reliably launched and controlled. Therefore, the hand-off issues described in the '307 patent are much simpler than those encountered in the Globalstar® system or similar LEO or MEO systems, or even those encountered in GEO systems which have dynamically varying beam shapes, which is another technological advance that is now feasible in satellite systems. That patent also does not address packet data services, since those were not widely used in the time frame of the patent. Other patents that address packet data services also do not address the LEO, MEO or dynamic beam GEO systems. The present invention describes a multi-beam LEO, MEO or GEO satellite system that can be used to provide packet data services (in addition to voice) for mobile users, that can be either initiating or receiving packet data calls over the system, while communicating with either a fixed or mobile user anywhere in the world.

III. OBJECTS OF THE INVENTION

There is, however, a continued demonstrated need to provide improved satellite constellation systems, preferably LEO systems, which provide multiple beam to a plurality of users and employ at least one gateway connected to a PSTN communicating with a user over the constellation, wherein each of said UTs within a given frequency band is distinguished from another employing orthogonal codes.

It is therefore an object of this invention to provide a satellite constellation system employing multiple beams to a plurality of users where each of the users within a given frequency band is distinguished from another employing a combination of time slots and orthogonal codes.

A further object of this invention is to provide a LEO satellite constellation system which provides multiple beams to a plurality of users employing at least one gateway connected to a PSTN wherein the users within a given frequency band are distinguished one from the other employing a combination of time slots and orthogonal codes.

Still another object of this invention is to provide an improved satellite constellation system which provides multiple beams to a plurality of users employing at least one gateway connected to the Internet wherein each of said users within an given frequency band is distinguished from another user employing a combination of time slots and orthogonal codes.

Again another object of this invention is to provide a GEO satellite constellation system providing multiple beams to a plurality of users employing at least one gateway and either connected to a PSTN or the Internet wherein a user within a given frequency band is distinguished from another user employing a combination of time slots and orthogonal codes.

Yet again another object of this invention is to provide an improved MEO satellite constellation system which provides multiple beams to a plurality of users employing at least one gateway connected to either a PSTN or the Internet wherein one user within a given frequency band is distinguished from another user employing a combination of time slots and orthogonal codes.

Yet again another object of this invention is to provide a satellite constellation system providing multiple beams to a plurality of users employing at least one gateway connected to either a PSTN or the Internet wherein one user within a given frequency band is distinguished from another user employing a combination of time slots and orthogonal codes.

IV. SUMMARY OF THE INVENTION

These and other objects of the instant invention are accomplished, generally speaking, by providing an improved satellite constellation system employing multiple beams to a plurality of user terminals wherein a gateway is employed to connect to either a PSTN or the Internet, communicating with a user terminal over the constellation so that the users within a given frequency range are distinguished one from the other employing a combination of time slots and orthogonal codes, i.e., a hybrid TDM/CDMA system.

Thus, for example, in a preferred embodiment a LEO satellite constellation comprising approximately 40 to 48 satellites as presently employed in the Globalstar® system is provided, employing multiple beams which may reach a plurality of user terminals. A gateway is employed connected to either a PSTN or the Internet and communicating with a user terminal over the constellation so that users within a given frequency range are distinguished one from the other employing a combination of time slots and orthogonal codes.

In a conventional embodiment of this system, the forward link from gateway through the satellite to the UT is similar to the terrestrial WCDMA forward link signal or wideband CDMA (code division multiple access) signal, except that the chip rate and the channel bandwidth are system specific. Each system is divided to frames with each frame divided into time slots. Each UT is distinguished based on a combination of time slots and orthogonal codes. Multiple codes from a single code tree, such as a set of orthogonal variable spread factor (OVSF) codes can be combined to offer different data rates as in terrestrial WCDMA. Long pseudo-random noise codes, or PN codes, are additionally used to distinguish each beam from each satellite as in the current Globalstar® system.

The power allocated to each UT based on UT type and/or UT mode of operation in each time slot is predetermined by the gateway and used to vary the data rate to the as its propagation environment changes. A similar technique is also used in HSDPA, or high speed digital packet access, in the terrestrial WCDMA standard. An alternative is to use power control similar to what is used in the current generation of Globalstar® where the UT data rate is kept constant and the power transmitted to the UT is varied according to propagation environment.

A center frequency of the signal transmitted to each UT is adjusted to precompensate for Doppler between the gateway and satellite, thus minimizing the search time and window that the UT needs to lock on to the signal. This technique is currently used in the Globalstar® system. Similarly, the timing of signals in each time slot transmitted to each UT is adjusted by the gateway based on a calculated position of each UT. This calculation may be done initially either by incorporating GPS into each UT, which informs the gateway of its coordinates, or by other known means of position location such as techniques currently used in the Globalstar® system which is based on triangulation using multiple different delays from different satellites and later on adjusting based on a rate of change of the UTs relative position to the serving Globalstar® system. The reverse link as presently employed in such a system is similar to the Globalstar® reverse link non-orthogonal, non-coherent CDMA but, in addition, it also employs time slots as in the forward link described above to allow each user to send as much or as little data as needed. Specifically, the reverse link employs short time slices of signals with different phase shifts of a long PN code to identify different users. In addition, it employs Walsh orthogonal modulation to provide high levels of immunity to noise as in the current Globalstar® system. However, the higher layers of the protocol are designed to be similar to the WCDMA higher layers so that the packet data can be officially transmitted without the need to set up dedicated channels as is done in the current Globalstar® system which employs circuit switching.

Reverse link power control can be performed as in the current Globalstar® system where data rate is fixed and power is varied as needed to meet the link budget or by varying the data rate and keeping UT power fixed as was previously mentioned for the forward link above. A trade off is employed between allowing a greater number of UT data rates to improve granularity of power utilization versus hardware complexity at the gateway.

The gateway receiver compensates for the gateway to satellite Doppler based on accurately known satellite positions and for the less precisely known UT locations.

Although any suitable code may be employed in the CDMA format, it is found that Walsh codes are preferable to provide a system which uniquely identifies each user on the forward link employing the unique mathematical orthogonality of the Walsh codes. It is found that Walsh codes are uniquely distinct so that voice data can only be recovered by a receiver applying the same Walsh code since the system discards all other signals as background noise.

Any suitable satellite may be employed in the system of the instant invention. Typical satellites include bent pipe repeaters, satellites equipped with low end processing power to those that include high processing systems.

Any suitable gateway may be employed in the system of the instant invention. Typical gateways include the Globalstar® gateway which is more fully described in U.S. Pat. No. 6,804,514, FIG. 2B.

The gateway consists of the following major subsystems:
a) Transceivers (21A) and associated RF antennas, which transmit RF signals to the satellite constellation and receive RF signals from the satellite constellation. A typical gateway for a satellite system has two or more antennas each of which is able to track one of the two or more satellites visible to the gateway.
b) A TDM/CDMA subsystem (21B) that modulates/demodulates and spreads/despreads the TDM/CDMA signals that are being transmitted/received by the transceivers (21A).
c) A Gateway Controller (GC) (21J) that is used to control the operation of all the gateway subsystems.
d) A Baseband Processing Subsystem (BPS) (21C) that processes and transmits the baseband signals between the TDM/CDMA subsystem (21B) and an IS-41 switch (21D) or a GSM switch (21E), both of which connect to the PSTN and enable the mobile satellite users' calls to be routed to and from terrestrial callers on the PSTN.

e) A Call Control Processor (CCP) (21H) that generally handles radio setup and channel assignments, along with other call related functions. The CCP may include the gateway Visitor Location Register (VLR) that enables roaming between gateways.

f) Current gateways comprise a Global Mobile System Interface (GSMI) (21I) or to a router which connects to the Internet. The router routes data packets to/from the Internet or other packet data network. The GSMI detects the presence of a GSM call and routes it to the GSM switch (21E) and enables GSM roaming. Optimal systems would not have a GSMI.

The signal is received at the MSS Gateway 21 and, after downconverting, demodulating in transceivers 21A and TDM/CDMA system 21B, and otherwise being processed, is delivered to a BPS 21C. The signal after processing by the BPS 21C is provided as an output. This output signal may be sent to a Mobile Switching Center (MSC), such as an IS-41 switch 21D or a GSM switch 21E (that contains the GSM VLR), or to a Router, or it may be provided directly to the HS/LS Interface 23 in the High Speed System 22. Depending on the means chosen, the signal is either routed via an internal or external network 30 to the Operations Center 40 (also referred to herein as the User Control Center). The signal is then processed by the Operations Center 40 and, depending on the nature of the call setup desired, is routed to the external network 41 for interaction with the Media provider, or is used otherwise in the Operations Center 40. The Operations Center 40 may be collocated with the Gateway 20, or it may be at a remote location and connected though the external network 30.

Further components of the MSS Gateway 21 include a Call Control Processor (CCP) 21H that generally handles radio setup and channel assignments, among other call-related functions. The CCP 21H can include the Gateway VLR. A GSMI 21I detects the presence of a GSM call and routes the call to the GSM switch 21E, enabling the possibility of GSM roaming. These various components can be included with or within a signaling system seven (SS-7) server unit. If present, the HLR could be part of the SS-7 server.

Block 21J represents the Gateway Controller (GC) that provides overall control of the Gateway 20, and that provides an interface to and controls the operation of the set of High Speed Equipment 22.

It should be noted that if the media or data flowing towards the user is low speed data, the signal after processing by the Operations Center 40 is sent to the MSS system for delivery via the satellites 3 to the UT 2 in the normal manner of the MSS system. The decision logic or point of which path (LS or HS) to use may be located in the Operations Center 40, or may be located in the HS/LS Interface 23.

The UT 2 can be used for the delivery of tracking and terminal control signals, as well as for low speed (MSS) data delivery and transmission. The MSS system receives supervision and control signals from the Operations Control Center 40 or from any external facility. Alternatively, the UT 2 and the Dual Terminal 10 can be controlled from the HS Data System 22 collocated with the MSS Gateway 21. Commands and other signals are sent via the MSS low speed data system over Control and Supervision Links. In an alternative embodiment the commands and other signals may be sent over the High Speed system. As was mentioned above, a packet data modem could also be used, as could more than one UT 2.

Tracking signals are important when the Dual Terminal 10 is fitted with tracking antennas 10A. A MSS Ground Operations Control Center (GOCC) 70 provides information over a Ground Data Network (GDN) 21F as to which satellite(s) of the constellation to use and for other transmission parameters, such as power at which to transmit, frequencies to use, which RF antenna(s) are to be used, etc. Antenna pointing information is sent to the Operations Center 40, which is preferably also connected to the GDN 21F. The tracking and other information is sent over the Control and Supervision links to the UT 2 and, after processing, to the baseband unit 14 of the Dual Terminal 10. The baseband unit 14 converts the information to control signals used by a Track Information unit 16 to point and track the antenna or antennas 10A of the Dual Terminal 10.

Also located in the High Speed Equipment System 22 of the Dual Gateway 20 is a Control and Billing Management system 22C. The Billing and Management system 22C is preferably connected to the GOCC 70 via the GDN 21F, but may instead be connected to the Gateway Management System (GMS) 21G of the MSS Gateway 21. The Billing and Management system 22C accounts for system usage and provides Call Detail Records and other information such that the user can be charged appropriately, and so that the air time used can be correctly charged to the system provider.

System control is exercised so that priorities of transmission are accounted for. For example, High Speed Data may be restricted during certain periods of time in order to allow maximum MSS voice circuit usage during high voice traffic periods. Conversely, more of the MSS bandwidth can be allocated to the High Speed Data Services during periods of lower MSS voice/data traffic demand. In this case the high speed data can be spread over a wider bandwidth, enabling higher data rates. It should be noted that in some embodiments it may not be necessary to share the in-band spectrum between the LS/HS services, as adjacent spectrum may be employed for providing the HS services (and/or for providing the LS services). Gateway provider control can be used for these purposes, or the control may be dictated by the GOCC 70 under the direction of the system operator.

Any suitable satellite constellation may be employed to practice the system of the instant invention. Typical satellite constellations include LEO, MEO and GEO. Preferred of these is the LEO satellite which provides the requisite signal reception, reliability and clarity.

Any suitable user terminal may be employed in the system of the instant invention. Typical user terminals include mobile phones, PDAs, laptops, fixed phones, satellite data modem, car kits, airplane phones, and any devices or sensors that can be interfaced to any of the above. Preferable of these is the Globalstar® satellite phone GSP 1600, Iridium satellite phone, and the like.

Any suitable gateway may be employed in the system of the instant invention. Typical gateways include those described in assignee Globalstar's® U.S. Pat. Nos. 6,775,251, 6,735,440, 6,661,996, 6,253,080, 6,134,423, 6,067,442, 5,918,157, 5,884,142, 5,812,538, 5,758,261, 5,634,190 and 5,592,481. A preferable one of these is the gateway as described in FIG. 2B of U.S. Pat. No. 6,804,514.

V. DESCRIPTION OF THE DRAWINGS

In FIG. 1 is seen a general depiction of the system of the instant satellite telephone system. Caller 100 dials a recipient's number 160 which sends a request to a satellite 110 in the caller's 100 view. The satellite 110 relays the signal to a gateway 120 Earth station in its view. The gateway 120 processes the signal and routes the call to the existing PSTN 130. The PSTN 130 routes the call to the gateway 140 nearest the recipient user 160. The gateway 140 transmits the signal up to a satellite 150 in its view and thereafter the satellite 150 relays the signal down to the receiving user 160. Either caller 100 or recipient 160 may initiate or receive packet data messages.

A description will now be made of a gateway to high speed downlink system, with low speed service.

Figure 2A:
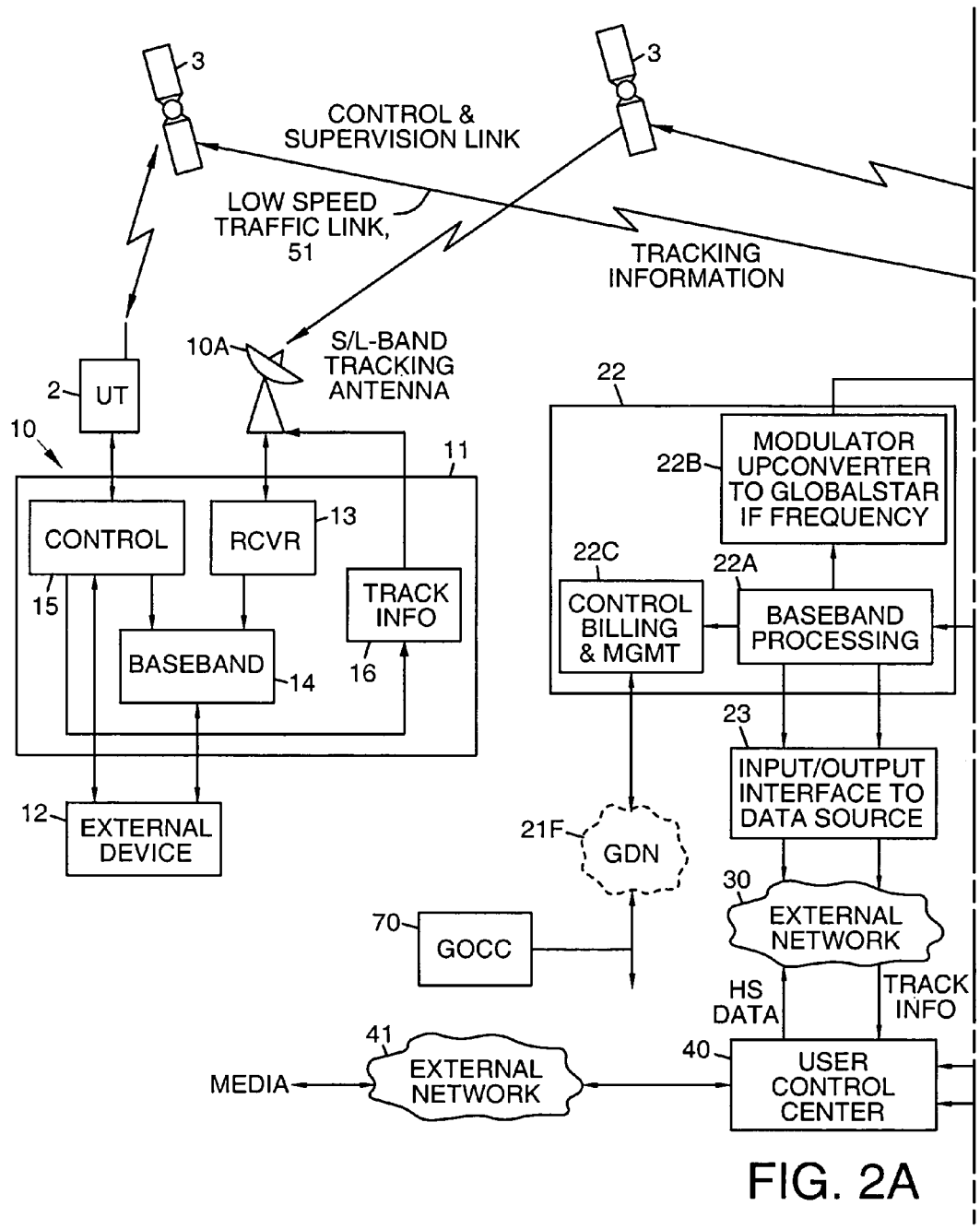
Figure 2B:
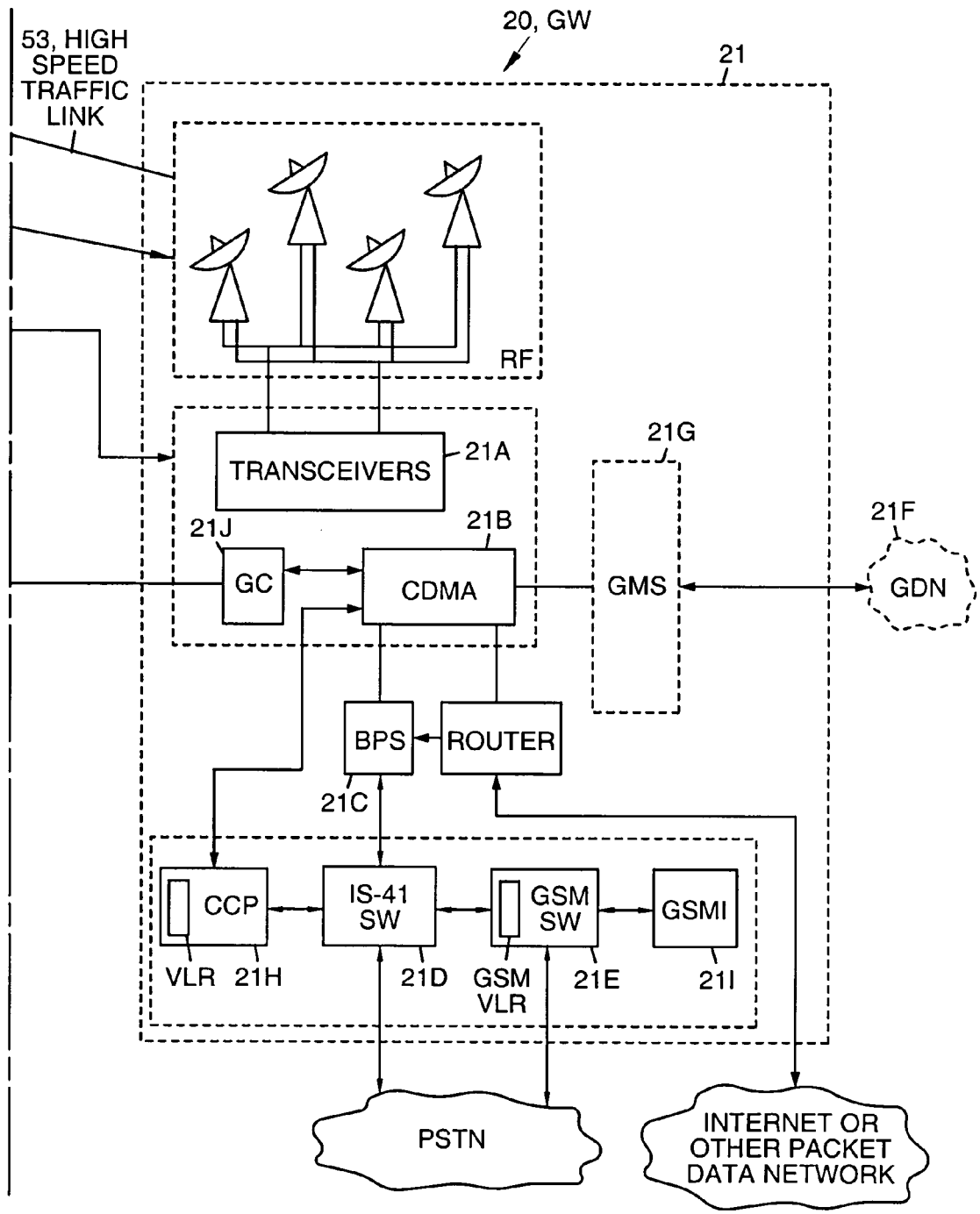

FIG. 2 shows the system 1 arranged for high speed data delivery to the Dual Terminal 10, referred to for convenience as configuration (a). Data flows to and from the Operations or User Control Center 40. High Speed Media such as Internet content, distance learning video, corporate training materials and video, and broadcast applications flow to the Operations Center 40 from an external network 41, such as the Internet or a corporate intranet or extranet. User generated information flows via satellite relay to the MSS Gateway 21 and by an internal network, or by the Internet, or by the PSTN, to the Operations Center 40, and is then sent over terrestrial or other satellite links (which can be the same as in this invention) to provide two way interactive communications with the information or media provider. High speed data is sent from the Operations Center 40 via an internal or external network connection to the HS/LS interface 23. After processing, the data is sent to the High Speed Equipment 22 that includes a baseband processor 22A and a modulator/upconverter 22B where the data is processed, modulated and upconverted to an Intermediate Frequency (IF) that matches the IF of the MSS Gateway 21. The HS Equipment 22 sends the data to the IF of the MSS Gateway 21 where it is combined with other data in that data stream. Selection of frequencies allows multiplexing of the signals. The High Speed Data IF is then upconverted to the desired transmit frequency and transmitted by the transmitter 21A of the MSS Gateway 21 toward the satellite 3. The satellite 3 repeats the signal toward the Dual Terminal 10. The Dual Terminal 10 is fitted with at least an omni-directional antenna, but preferably is fitted with at least one, but preferably two, tracking antennas 10A. Alternatively, a selectable multi-beam antenna may be used. The signal is received by the antenna 10A and is routed to a receiver 13 where it is downconverted and demodulated before being sent to a baseband processor 14. The signal, now a data stream, is next sent to external device 12, which could be a display or a PC or any suitable type of equipment for providing the user with the media sent from the Control Center 40. Note that the display or device 12 could be implemented so as to be internal to, or integral with, the UT 10.

A user response to the displayed media, e.g. keyboard input and/or mouse clicks, is typically data at a lower data rate than the high speed data sent to the user. For example, the user types a response on a keypad, or uses voice activation, or provides some other input controls or input data. This data can be provided from the external device 12, or the input may be generated internal to the Dual Terminal 10. The user inputted controls and/or data are routed through the High Speed Equipment 11, or it may be provided directly to the UT 2. In any case, the low speed data (e.g., 9600 baud or less) is routed to the UT 2 and is processed, modulated and transmitted according to the requirements of the MSS system.

In a preferred, but not limiting, embodiment the signal is modulated with a pseudorandom noise sequence and transmitted toward the satellite 3. The satellite 3 used for receiving the UT signals may be the same satellite as that used for the High Speed downlink signal, or may be any one of the constellation of satellites orbiting in the vicinity of the user and able to communicate to the Gateway 20 that the user is attached to. The signal sent to the satellite 3 is repeated to the Gateway 20 on the RD link used for the MSS system. The signal is received at the MSS Gateway 21 and, after downconverting, demodulating in transceivers 21A and CDMA system 21B, and otherwise being processed, is delivered to a BPS 21C. The signal after processing by the BPS 21C is provided as an output. This output signal may be sent to a Mobile Switching Center (MSC), such as an IS-41 switch 21D or a GSM switch 21E (that contains the GSM VLR), or to a Router, or it may be provided directly to the HS/LS Interface 23 in the High Speed System 22. Depending on the means chosen, the signal is either routed via an internal or external network 30 to the Operations Center 40 (also referred to herein as the User Control Center). The signal is then processed by the Operations Center 40 and, depending on the nature of the call setup desired, is routed to the external network 41 for interaction with the Media provider, or is used otherwise in the Operations Center 40. The Operations Center 40 may be collocated with the Gateway 20, or it may be at a remote location and connected though the external network 30.

Further components of the MSS Gateway 21 include a Call Control Processor (CCP) 21H that generally handles radio setup and channel assignments, among other call-related functions. The CCP 21H can include the Gateway VLR. A GSMI 21I detects the presence of a GSM call and routes the call to the GSM switch 21E, enabling the possibility of GSM roaming. These various components can be included with or within a signaling system seven (SS-7) server unit. If present, the HLR could be part of the SS-7 server.

Block 21J represents the Gateway Controller (GC) that provides overall control of the Gateway 20, and that provides an interface to and controls the operation of the set of High Speed Equipment 22.

It should be noted that if the media or data flowing towards the user is low speed data, the signal after processing by the Operations Center 40 is sent to the MSS system for delivery via the satellites 3 to the UT 2 in the normal manner of the MSS system. The decision logic or point of which path (LS or HS) to use may be located in the Operations Center 40, or may be located in the HS/LS Interface 23.

The UT 2 can be used for the delivery of tracking and terminal control signals, as well as for low speed (MSS) data delivery and transmission. The MSS system receives supervision and control signals from the Operations Control Center 40 or from any external facility. Alternatively, the UT 2 and the Dual Terminal 10 can be controlled from the HS Data System 22 collocated with the MSS Gateway 21. Commands and other signals are sent via the MSS low speed data system over Control and Supervision Links. In an alternative embodiment, the commands and other signals may be sent over the High Speed system. As was mentioned above, a packet data modem could also be used, as could more than one UT 2.

Tracking signals are important when the Dual Terminal 10 is fitted with tracking antennas 10A. A MSS Ground Operations Control Center (GOCC) 70 provides information over a Ground Data Network (GDN) 21F as to which satellite(s) of the constellation to use and for other transmission parameters, such as power at which to transmit, frequencies to use, which RF antenna(s) are to be used, etc. Antenna pointing information is sent to the Operations Center 40, which is preferably also connected to the GDN 21F. The tracking and other information is sent over the Control and Supervision links to the UT 2 and, after processing, to the baseband unit 14 of the Dual Terminal 10. The baseband unit 14 converts the information to control signals used by a Track Information unit 16 to point and track the antenna or antennas 10A of the Dual Terminal 10.

Also located in the High Speed Equipment System 22 of the Dual Gateway 20 is a Control and Billing Management system 22C. The Billing and Management system 22C is preferably connected to the GOCC 70 via the GDN 21F, but may instead be connected to the Gateway Management System (GMS) 21G of the MSS Gateway 21. The Billing and Management system 22C accounts for system usage and provides Call Detail Records and other information such that the user can be charged appropriately, and so that the air time used can be correctly charged to the system provider.

System control is exercised so that priorities of transmission are accounted for. For example, High Speed Data may be restricted during certain periods of time in order to allow maximum MSS voice circuit usage during high voice traffic periods. Conversely, more of the MSS bandwidth can be allocated to the High Speed Data Services during periods of lower MSS voice/data traffic demand. In this case the high speed data can be spread over a wider bandwidth, enabling higher data rates. It should be noted that in some embodiments it may not be necessary to share the in-band spectrum between the LS/HS services, as adjacent spectrum may be employed for providing the HS services (and/or for providing the LS services). Gateway provider control can be used for these purposes, or the control may be dictated by the GOCC 70 under the direction of the system operator.

VI. DETAILED DESCRIPTION OF THE INVENTION

The system of the instant invention, which is set out above in precise and accurate terms so as to enable one of ordinary skill in the art to practice same, will be better understood with reference to the following example.

EXAMPLE 1

User 1 dials user 2's number which generates a request to a satellite in user 1's view. The satellite relays the signal down to a gateway Earth station within the satellite's view. The gateway then processes the signal and routes the call to an existing PSTN or Internet in the locality. The PSTN or Internet then routes the call to the gateway in which the user is registered to receive the call, the gateway then transmits the signal up to a satellite in view and that satellite relays the signal down to U2, the receiving party. Each of the UTs within a given frequency band is distinguished one from the other employing a combination of time slots and orthogonal codes.

While the present invention has been particularly described with respect to certain components in its preferred embodiment, it will be understood that the invention is not limited to these particular components described in the preferred embodiments, or the sequence in employing or methods of processing the components. On the contrary, it is intended to cover all alternatives, modifications, and equivalents as may be included within the spirit and scope of the invention defined by the appended claims.

In addition, other components may be employed in the system of the instant invention as claimed as well as variations and alternatives to the components disclosed and claimed with similar results with regard to the operation and function of the system of the instant invention. In particular, the scope of the invention is intended to include, for example, GEO satellites equipped with dynamic beam forming which further enhances the performance of the system, or equipped with a Digital Channelizer Router (DCR) or employing virtual gateway techniques as set out in U.S. Pat. No. 6,735,440, especially in FIGS. 15B-C.

What is claimed is:

1. A satellite communication system for communicating between a plurality of user terminals comprising:
    a satellite constellation wherein each satellite of said constellation provides multiple beams;
    a plurality of user terminals that communicate with each other via satellites of said constellation;
    at least one gateway connected to a PSTN and communicating with at least one user terminal over the constellation wherein each of said user terminals within a given frequency band is distinguished from another of said user terminals employing a combination of time slots and orthogonal codes;
    wherein each of said user terminals is equipped to initiate or receive or terminate packet data messages;
    wherein each of said user terminals is handed off from one beam of a satellite to another beam of said satellite; and
    wherein said hand off is predicated on signal strength determined at said plurality of user terminals.

2. A satellite communication system as defined in claim 1 wherein said combination of time slots and orthogonal codes is implemented in a forward and return link.

3. A satellite communication system as defined in claim 2 wherein said forward link comprises orthogonal codes and said return link comprises a combination of time slots and phase shift of one or more pseudo-random codes.

4. A satellite communication system as defined in claim 1 wherein said satellite constellation comprises a LEO satellite constellation.

5. A satellite communication system as defined in claim 4 wherein said combination of time slots and orthogonal codes is implemented in a forward and return link.

6. The constellation as defined in claim 5 wherein said forward link comprises orthogonal codes and said return link comprises a combination of time slots and phase shift of one or more pseudo-random codes.

7. A satellite communication system as defined in claim 1 wherein said satellite constellation comprises a MEO satellite constellation.

8. The constellation as defined in claim 7 wherein said combination of time slots and orthogonal codes is implemented in a forward and return link.

9. A satellite communication system as defined in claim 1 wherein said satellite constellation comprises a GEO satellite constellation.

10. The constellation as defined in claim 8 wherein said forward link comprises orthogonal codes and said return link comprises a combination of time slots and phase shift of one or more pseudo-random codes.

11. The constellation as defined in claim 9 wherein said combination of time slots and orthogonal codes is implemented in a forward and return link.

12. A satellite communication system as defined in claim 11 wherein said forward link comprises orthogonal codes and said return link comprises a combination of time slots and phase shift of one or more pseudo-random codes.

13. A satellite communication system for communicating with a plurality of user terminals comprising:
    a satellite constellation wherein each satellite of said constellation provides multiple beams;
    a plurality of user terminals that communicate with each other, a PSTN, or a data network, via satellites of said constellation;

at least one gateway connected to a PSTN and/or a data network and communicating with at least one user terminal over the constellation wherein each of said user terminals within a given frequency band is distinguished from another of said user terminals employing a combination of time slots and orthogonal codes;

wherein each of said user terminals is equipped to initiate or receive or terminate packet data messages; and wherein each of said user terminals is handed off from one beam of a satellite to another beam of said satellite.

14. A satellite communication system as defined in claim 13 wherein said combination of time slots and orthogonal codes is implemented in a forward and return link.

15. A satellite communication system as defined in claim 14 wherein said forward link comprises orthogonal codes and said return link comprises a combination of time slots and phase shift of one or more pseudo-random codes.

16. A satellite communication system as defined in claim 13 wherein said satellite constellation comprises a LEO satellite constellation, wherein said combination of lime slots and orthogonal codes is implemented in a forward and return link, and wherein said forward link comprises orthogonal codes and said return link comprises a combination of time slots and phase shift of one or more pseudo-random codes.

17. A satellite communication system as defined in claim 13 wherein said satellite constellation comprises a MIEO satellite constellation, wherein said combination of time slots and orthogonal codes is implemented in a forward and return link, and wherein said forward link comprises orthogonal codes and said return link comprises a combination of time slots and phase shift of one or more pseudo-random codes.

18. A satellite communication system as defined in claim 13 wherein said satellite constellation comprises a GEO satellite constellation, wherein said combination of time slots and orthogonal codes is implemented in a forward and return link, and wherein said forward link comprises orthogonal codes and said return link comprises a combination of time slots and phase shift of one or more pseudo-random codes.

* * * * *